United States Patent [19]

von Gentzkow et al.

[11] Patent Number: 5,036,135
[45] Date of Patent: Jul. 30, 1991

[54] HEAT CURABLE, REACTION RESIN MIXTURES

[75] Inventors: Wolfgang von Gentzkow, Kleinsendelbach; Jürgen Huber, Erlangen; Wolfgang Rogler, Moehrendorf; Dieter Wilhelm, Forchheim, all of Fed. Rep. of Germany

[73] Assignee: Siemens Aktiengesellschaft, Berlin & Munich, Fed. Rep. of Germany

[21] Appl. No.: 555,252

[22] Filed: Jul. 19, 1990

[30] Foreign Application Priority Data

Jul. 19, 1989 [DE] Fed. Rep. of Germany ....... 3923915

[51] Int. Cl.$^5$ .............................................. C08L 75/04
[52] U.S. Cl. ..................... 524/786; 524/788; 524/858; 524/860; 524/868; 524/871; 528/28; 528/53; 528/72
[58] Field of Search ............... 524/786, 788, 858, 860, 524/868, 871; 528/28, 53, 72

[56] References Cited

U.S. PATENT DOCUMENTS

| | | | |
|---|---|---|---|
| 4,056,579 | 11/1977 | Nishikawa et al. | 260/830 |
| 4,070,416 | 1/1978 | Narahara et al. | 521/107 |
| 4,129,695 | 12/1978 | Bonin | 521/108 |
| 4,582,723 | 4/1986 | Markert et al. | 427/116 |
| 4,728,676 | 3/1988 | Miller et al. | 521/107 |

OTHER PUBLICATIONS

Moss et al., *Modified Isocyanurate Foams–Part III*, J. Cell. Plastics, vol. 13 (1977), pp. 399–403.

*Primary Examiner*—Maurice J. Welsh
*Attorney, Agent, or Firm*—Kenyon & Kenyon

[57] ABSTRACT

Reaction resin mixtures which can be economically processed provide inflammable molded materials with excellent mechanical properties and high dimensional stability under heat when they contain the following constituents: (A) a phosphorus-free polyfunctional epoxide; (B) an epoxy-group-containing phosphorus compound; (C) a polyfunctional isocyanate; (D) a curing catalyst; and, if required, (E) filler material.

20 Claims, No Drawings

HEAT CURABLE, REACTION RESIN MIXTURES

BACKGROUND OF THE INVENTION

1. Field of the Invention

The invention relates to heat curable, reaction resin mixtures as well as to reaction resin molded materials prepared from them.

2. Description of Related Art

Epoxy resins, in particular acid-anhydride curable epoxy resins, play an important role in electrical engineering. Namely, they are used in many application areas as solvent free reaction resins, in particular for insulating purposes. Thus, epoxy resins are used for producing insulating components, for insulating electrical windings and for covering and encasing electronic components and modules as well as in layering materials. The reaction resin molded materials which are prepared from epoxy resins have comparatively good thermo-mechanical properties. The recent, ever-growing trend in electronic engineering towards greater efficiency per volumetric unit or towards miniaturization, however, requires an application range for epoxy resin molded materials which is constantly expanding both in the direction of higher as well as lower temperatures. This requires molded materials with even better thermo-mechanical properties, for example such as improved thermal shock resistance along with simultaneously increased dimensional stability under heat (glass transition temperature).

These requirements can be satisfied by resinous compositions consisting of polyfunctional epoxides (EP) and polyfunctional isocyanates (IC). In the presence of suitable curing catalysts, these types of compositions polymerize into reaction resin molded materials, dimensionally stable under heat, which mostly consist of oxazolidinone structures (OX) and isocyanurate structures (ICR) (c.f. e.g.: DE-OS 25 43 386, DE-OS 33 23 153, DE-OS 36 00 764). By varying the initial molar ratio of the epoxide- and isocyanate functions, by the type of reaction accelerator, i.e., curing catalyst, and by selecting suitable curing temperatures, the concentration of OX- or ICR structures and thus the properties of the OX/ICR molded materials can be varied within broad limits. By using EP/IC resinous mixtures with a large surplus of isocyanate constituents, e.g. EP:IC<0.2, molded materials are obtained which predominantly consist of ICR structures. Although these types of molded materials have very high glass transition temperatures (>260° C.), they exhibit relatively poor mechanical properties; e.g., a low impact resistance. In contrast, if EP/IC resins are used with an EP:IC molar ratio of 1 together with imidazoles as curing catalysts, then one obtains molded materials with a high oxazolidinone concentration (OX:ICR>1) that have excellent mechanical properties at simultaneously high glass transition temperatures of approximately 200° C. OX/ICR molded materials consisting predominantly of ICR structures are very well suited as winding insulations for electrical machines, which are dimensionally stable under heat and long-term temperature-resistant, and for the construction of first rate layering materials; whereas, due to their excellent mechanical properties and thermal shock resistance, filler-containing OX/ICR molded materials with an OX:ICR ratio of >1 are very well suited for the production of insulating components as well as to the casting and encasing of electronic components.

To comply with national and international fire-protection regulations, polymer materials increasingly often must be inflammable or self-extinguishing in electrical engineering, in particular in electronics. For this purpose, the passing of one of the most stringent material testing standards is required, namely the flammability test according to Underwriter Laboratories Standard UL 94V with the rating V-0. During this test, five vertically clamped standard test pieces, respectively, are twice subjected to flame at the lower end for 10 seconds. The total of the ten postburning times, which cease at the point of extinguishment, must be <50 seconds and no individual value is allowed to exceed 10 seconds. This requirement is difficult to satisfy in the case of thin wall thicknesses of 1.6 mm and less which is typical in electronics.

It has been known for a long time that nitrogenated heterocyclic structures such as oxazolidinone- and isocyanurate structures reduce the flammability of reaction resin molded materials. Thus, for example, OX/ICR molded materials with high dimensional stability under heat, excellent long-term temperature resistance and inflammable or self-extinguishing properties are known from the teachings of DE-OS 23 59 386; however, closer specifications are not indicated. Our own analyses have shown, however, that the flame-retarding properties of such reaction resin molded materials, even at a concentration of 65 to 70% of inorganic filling agents like quartz powder and dolomite, are not sufficient to result in a rating of UL 94V-0 at wall thicknesses of 1.6 mm.

Also known is the use of EP/IC resins to prepare foamed materials which have acceptable flameproofness. The preparation of polymers with oxazolidinone and carbodiimide structures, which have an LOI-value (Limiting Oxygen Index) up to approximately 27, is described in DE-OS 25 51 631. There is a report in "J. Cell. Plastics", Vol. 13 (1977), pp 399 to 403, about testing the inflammability of oxazolidinone-modified isocyanurate foam: LOI values of 26 to 28 are thereby indicated for OX/ICR foamed materials having an 8 to 10 times surplus of isocyanate. The LOI values for materials known to be inflammable with the rating V-0, such polysulfones (LOI=30), polyvinyl chloride (LOI=42), polyvinylidene chloride (LOI=60) and polytetra fluoroethylene (LOI=95), however, are considerably higher (c.f.: D.W. v. Krevelen "Properties of Polymers", Elsevier Scientific Publishing Comp., Amsterdam, Oxford, N. Y., 1976, pp 526 fol.).

All currently known OX/ICR molded materials which are prepared from EP/IC resins have the disadvantage of not inherently being sufficiently inflammable. That is, they do not satisfy the indispensable requirement in electrical engineering—and particularly in electronics—of passing the flammability test according to UL 94V with the rating V-0 even at layer thicknesses of 1.6 mm and less. There are many basic possible ways known for improving the inflammability of reaction resin molded materials. In epoxy resin molded materials, often considerable amounts of nucleus-brominated aromatic epoxy resin constituents or halogenated additives and high concentrations of antimony trioxide are used to regulate inflammability. The problem with these compounds is that on the one hand, they are extremely effective as flame retardant agents, but on the other hand, they also have very dangerous properties. Thus, antimony trioxide is on the list of carcinogenic chemicals, and, during thermal decomposition, aromatic bromine compounds split off not only bromine radicals and hydrogen bromide, which cause pronounced corrosion, but also, in the case of decomposition in the presence of oxygen, the highly-brominated aromatics in particular can form the highly toxic polybromodibenzofuranes and polybromodibenzodioxins. The disposal of bromine-containing waste materials and toxic waste also presents considerable difficulties.

Furthermore, the addition of the following filling agents, or the partial substitution of customary inorganic filling agents by these types of materials, has already been suggested: filling agents with a quenching gas effect, such as hydrated aluminum oxides (c.f.: "J. Fire and Flammability", Vol. 3 (1972), pp 51 fol.), alkaline aluminum carbonates (c.f.: "Plast. Engng.", Vol. 32 (1976), pp 41 fol.) and magnesium hydroxides (EP-OS 0 243 201); or vitrifying filling agents such as borates (c.f. "Modern Plastics", Vol. 47 (1970), pp 140 fol.) and phosphates (U.S. Pat. No. 2,766,139 and U.S. Pat. No. 3,398,019). However, all these filling agents have the disadvantage that they in part considerably deteriorate the mechanical, chemical and electrical properties of the molded materials. Moreover, they sometimes drastically deteriorate the processing properties of the cast resins (abrasiveness, alkalinity). Furthermore, in the case of OX/ICR molded materials, the splitting off of the quenching gas is already to be feared during the preparation of the molded material due to the requisite high post-curing temperatures of up to 200° C.

Organic phosphorus compounds such as phosphoric acid esters, phosphonic acid esters and phosphines have also already been suggested as flame-retardant additives for epoxy resins (c.f.: W. C. Kuryla and A. J. Papa "Flame Retardancy of Polymeric Materials", Vol. 1, pp 24 to 38 and 52 to 61, Marcel Dekker Inc., New York, 1973). Since these compounds are known for their "plasticizing" properties and are used to a large extent worldwide as plasticizers for polymers (c.f. GB-PS 10 794), this alternative, too, is not very promising with regard to the heat resistance required of molded materials.

Accordingly, it is an object of the invention to provide heat curable reaction resin mixtures (based on EP/IC resins), which have good processing properties due to a low viscosity at the processing temperature and a long shelf life.

It is a further object of the invention to provide heat curable reaction resin mixtures which can be economically converted by conventional methods for processing cast resins into reaction resin molded materials which are inherently (i.e., without the addition of halogen compounds or antimony trioxide) inflammable and thus are rated V-0 according to UL 94V without having the high dimensional stability under heat as well as the good electrical and mechanical properties, which OX/ICR molded materials have, being negatively influenced.

SUMMARY OF THE INVENTION

In accordance with the invention reaction resin mixtures are provided containing the following constituents:

(A) a phosphorus-free, polyfunctional epoxide;
(B) an epoxy group-containing phosphorus compound of the following structure:

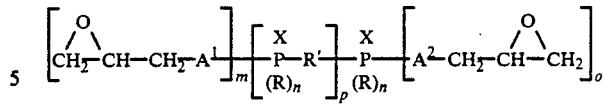

with $m=0$ or 1, $n=0,1$ or 2 and $o=1,2$ or 3, where the following holds: $m+n+o=3$, and with $p=0$, 1 or 2;

X signifies a free electron pair or an O— or S— atom bonded by way of a double bond;

R signifies an alkyl residue having 1 to 4 C-atoms; an alkenyl residue having 2 to 3 C-atoms; an aryl residue such as phenyl, alkoxyphenyl, nitrophenyl, naphthyl and biphenyl; an arylalkyl residue such as benzyl; a dialkyl-amino residue or alkyl-aryl-amino residue or a 3-trialkylsilyl-propyl residue; R being bonded directly or by way of O or S;

R' denotes a bridge of O, S, phenylene, dioxyphenylene, dioxynaphthylene, $(CH_2)_r$, $O-(CH_2)_r$, $O-(CH_2-)-O$ or $O-(CH_2)_r-(Si(CH_3)_2-O)_s-Si(CH_3)_2-(CH_2)_r-O$ with $r=1$ to 3 and $s=1$ to 8, or $(O-CH_2-CH_2)_r-O$, $(O-CH(CH_3)-CH_2)_r-O$ or $(O-(CH_2)_4)_r-O$ with $t=2$ to 100; and $A^1$ and $A^2$, which can be equal or different, denote a single bond or a bridge according to the grouping R';

(C) a polyfunctional isocyanate;
(D) a curing catalyst; and, if applicable,
(E) filler material.

The reaction resin mixtures according to the invention are solvent-free yet low-viscous, castable and impregnable EP/IC resins which can be processed economically. By curing these resins at temperatures of up to 200° C., inflammable OX/ICR molded materials with the rating UL 94V-0 are obtained. These molded materials, which are so-called FRNC molded materials (FRNC=Flame Retardant Non Corrosive), have both excellent mechanical properties and high dimensional stability under heat. Moreover, the electrical properties in these molded materials are not negatively influenced by the phosphorus compound.

DETAILED DESCRIPTION OF THE INVENTION

Relatively low viscous, aliphatic, cycloaliphatic or aromatic epoxides as well as their mixtures are particularly well suited as the polyfunctional epoxide, i.e., as polyglycidyl compound. The following compounds are preferred: bisphenol-A-diglycidyl ether, bisphenol-F-diglycidyl ether, 3,4-epoxycyclohexylmethyl-3',4'-epoxycyclohexanecarboxylate; polyglycidyl ethers from phenol/formaldehyde- and cresol/formaldehyde novolaks; diglycidyl esters from phthalic-, isophthalic- and terephthalic acid; as well as mixtures of these types of epoxy resins. Additional suitable polyepoxides are, for example, hydrogenated bisphenol-A- or bisphenol-F-diglycidyl ethers, hydantoin epoxy resins, triglycidyl isocyanurate, triglycidyl-p-aminophenol, tetraglycidyl diaminodiphenyl methane, tetraglycidyl diaminodiphenyl ether, tetrakis(4-glycidoxyphenyl)-ethane, urazole epoxides and epoxides which are described in the "Handbook of Epoxy Resins" (McGraw-Hill Book Company, 1967) by Henry Lee and Kris Neville, and in the Monograph "Epoxy Resins" (American Chemical Society, 1970) by Henry Lee.

The constituent (B) can also be used in both the form of single compounds as well as in the form of a mixture of several compounds, whereby compounds with lower viscosity (<500 mPa.s at room temperature) are preferred. For example, [the following] are suitable as constituent (B): methyl-diglycidyl-phosphonate, ethyl-diglycidyl-phosphonate, propyl-diglycidyl-phosphonate, butyl-diglycidyl-phosphonate, vinyl-diglycidyl-phosphonate, phenyl-diglycidyl-phosphonate and biphenyl-diglycidyl-phosphonate; methyl-diglycidyl-phosphate, ethyl-diglycidyl-phosphate, n-propyl-diglycidyl-phosphate, n-butyl-diglycidyl-phosphate, isobutyl-diglycidyl-phosphate, allyl-diglycidyl-phosphate, phenyl-diglycidyl-phosphate, p-methoxyphenyl-diglycidyl-phosphate, p-ethoxyphenyl-diglycidyl-phosphate, p-propyloxyphenyl-diglycidyl-phosphate, p-isopropyloxyphenyl-diglycidyl-phosphate, phenylthio-diglycidyl-phosphate, triglycidyl-phosphate, Tris(-glycidylethyl)-phosphate, p-glycidylphenyl-ethyl-glycidyl-phosphate and benzyl-diglycidyl-thiophosphate.

The synthesis of these compounds takes place e.g. by converting phosphonic acid- or phosphoric acid chlorides with glycidol (c.f.: "Zh. Obshch. Khim.", Vol. 54, Issue 10 (1984), pp 2404 fol.), by converting phosphoric acid or phosphonic acids with epichlorhydrin (JP-OS 51-143620) or by epoxidizing phosphorus compounds which contain residues with olefinic double bonds (U.S. Pat. No. 2,856,369).

Relatively low viscous, aliphatic, cycloaliphatic or aromatic polyisocyanates as well as their mixtures are particularly well suited as polyfunctional isocyanates, i.e., constituent (C). The following compounds are preferred: isomer mixtures of 4,4'- and 2,4'-diphenylmethane diisocyanate, polyol-modified polyisocyanates and mixtures of liquid polyisocyanates with polyisocyanates of greater molecularity or carbodiimide-polyisocyanates. Additional suitable polyisocyanates are, e.g.: hexane-1,6-diisocyanate, cyclohexane-1,3-diisocyanate and isomers thereof; 4,4'-dicyclohexylmethane diisocyanate, 3-isocyanatomethyl-3,5,5-trimethylcyclohexyl isocyanate, 1-methylbenzene-2,4-diisocyanate and isomers thereof; naphthalin-1,4-diisocyanate, diphenylether-4,4'-diisocyanate and isomers thereof; diphenylsulfone-4,4'-diisocyanate and isomers thereof; as well as tri- or higher functional isocyantes such as 3,3',4,4'-diphenylmethane-tetraisocyanate. Furthermore, isocyanates can also be used which are masked in the usual manner with phenol or cresol. Dimers and trimers of the said polyvalent isocyanates are also able to be used. These types of polyisocyanates have terminal free isocyanate groups and contain one or several uretdione- and/or isocyanurate rings. Methods of preparing various types of such trimers and uretdiones are described e.g. in the U.S. Pat. Nos. 3,494,888, 3,108,100 and 2,977,370.

The mix ratio of the epoxide constituents (A) and (B) on the one hand and the isocyanate constituents (C) on the other hand can vary within a broad range, and indeed according to which thermo-mechanical properties of the molded materials are being sought. However, EP:IC ratios between 1:5 and 5:1, referring to the molar ratio of the epoxy- and isocyanate functions, are preferred. In the case of EP:IC ratios with an IC surplus greater than 1:5, molded materials with very high glass transition temperatures but with unsatisfactory mechanical properties are obtained. In the case of a high epoxide surplus, one obtains molded materials with insufficient thermo-mechanical properties. Also, the mix ratio between the epoxide constituents (A) and (B) can be varied within a broad range according to the desired spectrum of properties. The mix ratio of (A) to (B) advantageously equals 1:4 to 4:1, preferably 1:2 to 2:1, referring respectively to the molar ratio of the epoxide functions.

The reaction resin mixtures according to the invention can also contain constituents which generally are not involved in the chemical reactions that result in the OX/ICR molded materials: namely, filling agents, i.e. filler materials. Mineral and fibrous materials such as quartz powder, fused quartz, aluminum oxide, powdered glass, mica, kaolin, dolomite, graphite and soot as well as carbon fibers, glass fibers and textile fibers are suitable as filling agents. The concentration of filling agents can amount to up to 70 mass % in the reaction resin mixtures according to the invention. Colorants, stabilizing agents and adhesive agents as well as other additives of the usual sort can also be added to the EP/IC resins.

The curing catalyst, which promotes the formation of the OX- and ICR rings during the curing process, plays an important role in the reaction resin mixtures according to the invention. Generally, tertiary amines or imidazoles are thereby used as catalysts. The following compounds e.g. are suitable as tertiary amines: tetramethylethylene diamine, dimethyloctylamine, dimethylaminoethanol, dimethylbenzylamine, 2,4,6-tris(-dimethyl-aminomethyl)-phenol, N,N'-tetramethyl-diaminodiphenyl methane, N,N'-dimethylpiperazine, N-methylmorpholine, N-methylpiperidine, N-ethylpyrrolidine, 1,4-diazabicyclo-2,2,2-octane and quinolines. Suitable imidazoles are e.g.: 1-methylimidazole, 2-methylimidazole, 1,2,4,5-tetramethylimidazole, 1-benzyl-2-phenylimidazole, 2-undecylimidazole, 2-heptadecylimidazole, 2-ethyl-4-methylimidazole, 1-cyanoethyl-2-ethyl-4-methylimidazole and 1-cyanoethyl-2-phenylimidazole.

The said curing catalysts already react at low temperatures and thus result in relatively short pot lives, which can make the processing of the EP/IC resins more difficult. Therefore, latent curing catalysts are preferably used which guarantee a sufficient period of usability at low temperatures. Addition complexes of boron trihalides with tertiary amines and imidazoles are particularly suitable as those types of catalysts which are also classified as latent reaction accelerating agents, for example the addition complexes consisting of boron trichloride and tertiary amines of the general formula $BCl_3.NR^1R^2R^3$, in which $R^1$, $R^2$ and $R^3$ are the same or different aliphatic, aromatic, heterocyclic or arylaliphatic residues which pairwise can also be a component of heterocyclic rings, which are described in DE-PS 26 55 367. The analogous complexes of boron trifluoride of the general formula $BF_3.NR^1R^2R^3$, whereby $R^1$, $R^2$ and $R^3$ have the aforesaid significance, are also suitable. Specific examples of suitable tertiary amines of the $BF_3$ and $BCl_3$ complexes are octyldimethylamine and benzyldimethylamine. Morpholine compounds and imidazoles, in particular N-methylmorpholine, 1,2-dimethylimidazole and 1-benzyl-2-phenylimidazole are also suitable for the formation of $BCl_3$- or $BF_3$ complexes.

Furthermore, onium salts of tertiary amines and imidazoles, i.e. onium salts with N as the central atom, are advantageously suitable as curing catalysts for the reaction resin mixtures according to the invention. Examples of suitable onium salts are: tetraethyl ammoniumchloride, tetraethyl ammoniumbromide, octyltrimethyl ammoniumbromide, benzyltrimethyl ammoniumchloride, N-ethyl morpholiniumbromide, 2-ethyl-4- methylimidazoliumbromide, N-ethyl morpholinium tetraphenylborate, 1,2-dimethylimidazoliumtetraphenylborate and tetrabutylammonium tetraphenylborate.

The concentration of the curing catalyst in the EP/IC resins advantageously amounts to 0.01 to 5 mass %, preferably 0.25 to 2.5 mass %, respectively referring to the mass of the resinous matrix. Incidentally, the curing temperature, which ranges approximately between 50° C. and 200° C., can be influenced by the type and by the concentration of the curing catalyst. If required, however, the curing or gelling process can also be started already at room temperature.

The reaction resin mixtures according to the invention can be processed according to the methods for processing epoxy resins which are customary in electrical engineering, such as vacuum casting or the low pressure injection molding process. These reaction resin mixtures are particularly suited to casting and encasing electronic components, for winding insulations and for producing insulating parts as well as for use in printed circuit board engineering and to prepare laminates.

The invention shall be more closely explained in light of exemplified embodiments.

EXAMPLE 1

A mixture of A parts by weight (MT) of a bisphenol-F-diglycidyl ether (EP-value: 0.61 mol/100 g), C MT of an isomer mixture of diphenylmethane diisocyanate (IC-value: 0.79 mol/100 g) which is liquid at room temperature, and E MT of quartz powder (16900 mesh openings/cm$^2$) is degassed for 4 hours at a temperature of 80° C. and at a pressure of <1 mbar while stirring. This is subsequently cooled down to 50° C. and then B MT phenyl-diglycidyl-phosphonate (EP-value: 0.72 mol/100 g) and D MT of the BCl$_3$ adduct of dimethylbenzylamine is added. The mixture is degassed while stirring for 2 more hours at 50° C. and at a pressure <1 mbar and is subsequently poured under pressure (3 bar) into a standard test bar, mold which was preheated to 150° C. After 10 minutes, this is removed from the mold and then is post-cured for 8 hours at 150° C. and for 16 hours at 200° C. The composition of the various mixtures which were analyzed is indicated in Table 1. The flexural strength, the impact resistance and the glass transition temperature, which were determined on the obtained standard test specimen, are represented in Table 2.

To produce 1.6 mm thick test pieces for the flammability test according to UL 94V, 1.6 mm thick sheets are produced in the manner such that the prepared resinous compounds are poured into a mold which is preheated to 120° C. from vacuum into vacuum, and are tempercured for 1 hour at 120° C., 8 hours at 150° C. and 16 hours at 200° C. The test bars required for the flammability test according to UL 94V are sawn from the sheets. The detected burning times as well as the rating according to UL 94V are also found in Table 2.

TABLE 1

| | Mixture Composition | | | | |
|---|---|---|---|---|---|
| Mixture | 1 | 2 | 3 | 4 | 5 |
| Constituents: | | | | | |
| A (MT) | 246 | 163 | 197 | 328 | 60 |
| B (MT) | — | 72 | 42 | 138 | 52 |
| C (MT) | 190 | 190 | 190 | 190 | 190 |
| D (MT) | 4.4 | 4.2 | 4.3 | 6.6 | 3.0 |
| E (MT) | 854 | 830 | 841 | 1286 | 592 |

TABLE 1-continued

| | Mixture Composition | | | | |
|---|---|---|---|---|---|
| Mixture | 1 | 2 | 3 | 4 | 5 |
| Ratio: | | | | | |
| (A):(B) (mol/mol) | | 2:1 | 4:1 | 2:1 | 1:1 |
| EP:IC (mol/mol) | 1:1 | 1:1 | 1:1 | 2:1 | 1:2 |

TABLE 2:

| Properties of the OX/ICR Molded Materials | | | | | |
|---|---|---|---|---|---|
| Molded material | 1 | 2 | 3 | 4 | 5 |
| Properties: | | | | | |
| Flexural strength (N/mm$^2$) | 130 | 127 | 128 | 140 | 105 |
| Impact resistance (Nmm/mm$^2$) | 11.5 | 9.6 | 11.4 | 14.2 | 8.1 |
| Glass transition temperature (°C.) | 225 | 229 | 220 | 195 | 264 |
| Average burning time(s) | >45 | 4.0 | 4.8 | 4.7 | 3.2 |
| Rating according to UL 94 V | not possible | V-O | V-O | V-O | V-O |

EXAMPLE 2

The amounts indicated in Table 3 of bisphenol-A-diglycidyl-ether (constituent A; EP-value: 0.57 mol/100 g), of a liquid isomer mixture of diphenylmethane diisocyanate (constituent C; IC value: 0.79 mol/100 g), of the boron trichloride complex of dimethylbenzylamine (constituent D) and of quartz powder (constituent E; 16900 mesh openings/cm$^2$) are compounded with various glycidyl phosphorus compounds (ratio of glycidyl phosphorus compound to bisphenol-A-diglycidylether = 1:2 mol/mol, referring to the concentration of epoxide groups) and the mixtures are treated as in example 1. All mixtures contain equimolar amounts of epoxy compounds and isocyanate compounds. The mechanical properties detected on the test pieces as well as the burning times and the rating according to UL 94V are summarized in Table 4.

TABLE 3:

| | Mixture Composition | | | |
|---|---|---|---|---|
| Mixture | 6 | 7 | 8 | 9 |
| Constituents: | | | | |
| A (MT) | 175 | 175 | 175 | 175 |
| C (MT) | 190 | 190 | 190 | 190 |
| D (MT) | 4.2 | 4.2 | 4.4 | 4.1 |
| E (MT) | 820 | 825 | 855 | 804 |
| Methyl-diglycidyl-phosphonate (MT) | 52 | — | — | — |
| Methyl-diglycidyl-phosphate (MT) | — | 56 | — | — |
| Phenyl-diglycidyl-phosphonate (MT) | — | — | 71 | — |
| Triglycidyl-phosphate (MT) | — | — | — | 45 |

TABLE 4:

| Properties of the OX/ICR Molded Materials | | | | |
|---|---|---|---|---|
| Molded material | 6 | 7 | 8 | 9 |
| Properties: | | | | |
| Flexural strength (N/mm$^2$) | 130 | 125 | 122 | 115 |
| Impact resistance (Nmm/mm$^2$) | 12.1 | 10.2 | 11.5 | 9.1 |
| Glass transition temperature (°C.) | 220 | 210 | 232 | 244 |
| Average burning time(s) | 4.5 | 4.5 | 2.9 | 4.9 |
| Rating according to UL 94 V | V-O | V-O | V-O | V-O |

EXAMPLE 3

The period of usability was determined from the EP/IC resin mixtures 1 and 2 (c.f. example 1). For this purpose, the resin mixtures were mixed and treated as described and subsequently the viscosity progression was monitored in a Haake-Rotovisko SV 1 (cylindrical measuring instrument) at 50° C. as a function of time. A comparison shows that the cast resin viscosity is considerably reduced by the glycidyl phosphorus compound used in mixture 2, indeed from approximately 7600 mPa.s to approximately 2050 mPa.s; in this manner, the processability is improved. Moreover, no increase in viscosity takes place within 4 hours at processing temperature (50° C.). Thus, the reaction resin mixtures according to the invention are able to be processed without any problems.

What is claimed is:

1. A heat curable reaction resin mixture comprising the following constituents:
   (A) a phosphorus-free, polyfunctional epoxide;
   (B) an epoxy group-containing phosphorus compound of the following structure:

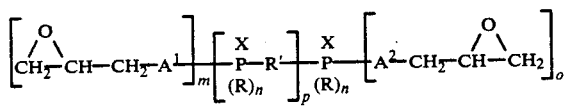

with $m=0$ or 1, $n=0$, 1 or 2 and $o=1$, 2 or 3, where the following holds: $m+n+o=3$, and with $p=0$, 1 or 2;

X signifies a free electron pair or an O— or S— atom bonded by way of a double bond;

R signifies an alkyl residue having 1 to 4 C-atoms; an alkenyl residue having 2 to 3 C-atoms; an aryl residue; an arylalkyl residue; a dialkyl-amino residue or alkyl-aryl-amino residue or a 3-trialkylsilyl-propyl residue; R being bonded directly or by way of O or S;

R' denotes a bridge of O, S, phenylene, dioxyphenylene, dioxynaphthylene, $(CH_2)_r$, $O—(CH_2)_r$, $O—(CH_2)_r—O$ or $O—(CH_2)_r—(Si(CH_3)_2—O)_s—Si(CH_3)_2—(CH_2)_r—O$ with $r=1$ to 3 and $s=1$ to 8, or $(O—CH_2—CH_2)_r—O$, $(O—CH(CH_3)—CH_2)_r—O$ or $(O—(CH_2)_4)_r—O$ with $t=2$ to 100; and $A^1$ and $A^2$, which can be equal or different, denote a single bond or a bridge according to the grouping R';

(C) a polyfunctional isocyanate; and
(D) a curing catalyst.

2. The reaction resin mixture according to claim 1 further comprising the following constituent:
   (E) filler material 3. The reaction resin mixture according to claim 1 wherein the aryl residue which can be R of constituent (B) is one of phenyl, alkoxyphenyl, nitrophenyl, naphthyl and biphenyl.

4. The reaction resin mixture according to claim 1 wherein the arylalkyl residue which can be R of constituent (B) is benzyl.

5. The reaction resin mixture according to claim 1 wherein the constituent (B) comprises a di- or triglycidylester of the phosphoric acid or a mixture of these compounds.

6. The reaction resin mixture according to claim 1 wherein the constituent (B) comprises a diglycidylester of an alkyl- or aryl phosphonic acid or a mixture of these compounds.

7. The reaction resin mixture according to claim 1 wherein the constituent (B) comprises a di- or triglycidylether of an alkyl- or aryl phosphine oxide or a mixture of these compounds.

8. The reaction resin mixture according to claim 1 wherein the molar ratio of epoxy- to isocyanate groups equals between 1:5 and 5:1.

9. The reaction resin mixture according to claim 1 wherein the molar ratio of the epoxy functions of the constituents (A) and (B) equals 1:4 to 4:1.

10. The reaction resin mixture according to claim 9 wherein the molar ratio of the epoxy functions of the constituents (A) and (B) equals 1:2 to 2:1.

11. The reaction resin mixture according to claim 1 wherein the curing catalyst comprises an addition complex or an onium salt of a tertiary amine or of an imidazole.

12. The reaction resin mixture according to claim 1 wherein the concentration of the curing catalyst equals 0.01 to 5 mass %, referring to the resinous matrix.

13. The reaction resin mixture according to claim 2 wherein the filler material is at least one of quartz powder, fused quartz, aluminum oxide and dolomite.

14. A reaction resin molded material prepared from the reaction resin mixture according to claim 1.

15. The reaction resin mixture according to claim 5 wherein the molar ratio of epoxy- to isocyanate groups equals between 1:5 and 5:1.

16. The reaction resin mixture according to claim 6 wherein the molar ratio of epoxy- to isocyanate groups equals between 1:5 and 5:1.

17. The reaction resin mixture according to claim 7 wherein the molar ratio of epoxy- to isocyanate groups equals between 1:5 and 5:1.

18. The reaction resin mixture according to claim 5 wherein the molar ratio of the epoxy functions of the constituents (A) and (B) equals 1:4 to 4:1.

19. The reaction resin mixture according to claim 6 wherein the molar ratio of the epoxy functions of the constituents (A) and (B) equals 1:4 to 4:1.

20. The reaction resin mixture according to claim 7 wherein the molar ratio of the epoxy functions of the constituents (A) and (B) equals 1:4 to 4:1.

* * * * *